(12) United States Patent
Widemann

(10) Patent No.: US 7,000,387 B2
(45) Date of Patent: Feb. 21, 2006

(54) HYDRAULIC SPOOL VALVE FOR USE IN A HYDRAULIC VEHICLE DRIVE

(75) Inventor: Axel Widemann, Neumünster (DE)

(73) Assignee: Sauer-Danfoss (Neumunster) GmbH & Co. OHG, (DE)

( * ) Notice: Subject to any disclaimer, the term of this patent is extended or adjusted under 35 U.S.C. 154(b) by 13 days.

(21) Appl. No.: 10/815,486

(22) Filed: Apr. 1, 2004

(65) Prior Publication Data

US 2004/0211175 A1    Oct. 28, 2004

(30) Foreign Application Priority Data

Apr. 4, 2003    (DE) .............................. 103 15 512

(51) Int. Cl.
*F16D 31/02*    (2006.01)
(52) U.S. Cl. ..................... 60/464; 137/115.16
(58) Field of Classification Search .................. 60/464, 60/468, 489; 137/505, 115.16
See application file for complete search history.

(56) References Cited

U.S. PATENT DOCUMENTS

| 3,561,214 A | | 2/1971 | Bobst | |
|---|---|---|---|---|
| 3,846,982 A | * | 11/1974 | Rometsch et al. | ............ 60/464 |
| 4,341,133 A | * | 7/1982 | Sakamoto | ...................... 60/489 |
| 4,531,369 A | * | 7/1985 | Izumi et al. | ................... 60/464 |
| 6,295,811 B1 | * | 10/2001 | Mangano et al. | ............. 60/468 |
| 6,339,928 B1 | * | 1/2002 | Gollner | ........................ 60/464 |

OTHER PUBLICATIONS

Sauer Sundstrand, Baureihe—Series 90, Jun., 1992—16 pages.

* cited by examiner

*Primary Examiner*—Edward K. Look
*Assistant Examiner*—Michael Leslie

(57) ABSTRACT

A hydraulic spool valve is provided in which two inlet bores and an outlet bore lead into a housing. A spool-valve piston which is under the influence of compression springs on both sides can be displaced longitudinally in the housing. When a difference in pressure of the hydraulic fluid in the inlet bores occurs, the inlet bore which conducts the lower pressure in each case is connected to the outlet bore. The two compression springs are pre-stressed and have an additional expansion path. During the displacement of the spool-valve piston from a neutral central position into an extended intermediate position, the two compression springs therefore remain in operative connection with the spool-valve piston, in which case the spring forces counterbalance each other until the intermediate position is reached.

10 Claims, 7 Drawing Sheets

HYDRAULIC SPOOL VALVE FOR USE IN A HYDRAULIC VEHICLE DRIVE

BACKGROUND OF THE INVENTION

The present invention relates to a hydraulic spool valve and, more specifically, to a hydraulic spool valve used in a hydraulic vehicle drive.

Hydraulic spool valves of this type are known in the prior art. One example is shown in the publication "Axialkolben-Motoren Baureihe 90" ("Series 90 Axial Piston Motors") by Sauer-Sundstrand GmbH & Co., publication number SMF9, 06/92, 699801D. These spool valves serve as a function of the hydraulic fluid pressure in the two lines conducting the hydraulic fluid to cause the hydraulic fluid having the lower pressure to flow out through the outlet bore as soon as the difference in pressure has reached a certain level.

Hydraulic vehicle drives are a typical application of a hydraulic spool valve of this type. Hydraulic vehicle drives typically have a closed hydraulic circuit, which comprises a variable displacement pump, a hydraulic motor driving the drive wheels of the vehicle and two lines which connect the variable displacement pump and the hydraulic motor and are intended for the hydraulic fluid. Since the hydraulic fluid is heated considerably during the normal driving mode, a constant exchange of the hydraulic fluid is required, and the hydraulic motor has to be cooled. When a certain difference in pressure in the forward-flow and return line of the hydraulic motor is reached, the hydraulic spool valve opens and allows a flushing flow to flow from the low-pressure side through a flushing-pressure-limiting valve. This gives rise, during the normal driving mode, to a continuous leakage flow which can amount to approximately 10% of the maximum circulation of the hydraulic fluid in the closed circuit.

Conventional hydraulic spool valves are designed in such a manner that, in the neutral central position of the spool-valve piston, the pre-stressed compression springs on both sides of the spool-valve piston act upon the piston and bear at the same time against stops of the spool-valve housing. As soon as the difference in pressure of the hydraulic fluid in the two inlet bores of the spool valve affect the displacement of the spool-valve piston in the housing, the compression spring, which is pre-stressed in the direction of the displacement movement, is therefore rendered ineffective because it comes to rest against the stop of the spool-valve housing. The spool-valve piston is decoupled to a certain extent from this compression spring, and so only the other compression spring which acts counter to the displacement movement remains effective. The hydraulic fluid which is under relatively high pressure therefore has to overcome the forces acting in the opposite direction on the spool-valve piston and originate from the compression spring, which still remains effective, and the hydraulic fluid having the lower pressure.

Because of this, most applications generally operate with high pressures and powerful compression springs. In the case of flushing spool valves, the spring pre-stressing forces corresponding to an opening pressure from the neutral central position typically are in the range of 7 to 16 bar. Under selected operating conditions, the hydraulic spool valves according to the prior art operate satisfactorily. Difficulties arise, however, if the same hydraulic spool valves are also intended to operate as a high-pressure and low-pressure side when there are small differences in pressure and frequent changing of the inlet bores. This may have the effect of a spool valve of this type remaining in its neutral central position, in which the through flow of hydraulic fluid is blocked. However, even with these relatively small differences in pressure and the associated fluctuations, an opening is urgently required for operational reasons.

Hydraulic vehicle drives of this type belong to the prior art. As mentioned above, flushing spool valves which connect the low-pressure side, i.e. that side which transports the oil back to the variable displacement pump to the flushing-pressure limiting valve, are customary here. This flushing-pressure limiting valve is set to a lower pressure of the hydraulic fluid than the filling-pressure limiting valve of the filling pump, which is customarily present. This continuously produces an artificial leakage. The flushing spool valve is equipped, according to the prior art, with compression springs which, when the pressure between the high pressure side and the low-pressure side is the same, push the spool-valve piston into its neutral central position, in which no scouring takes place via the flushing-pressure limiting valve. By contrast, when there are clear differences in pressure between the high-pressure side and low-pressure side, such as those corresponding to an opening pressure of between 7 and 16 bar, the flushing spool valve opens and conducts the low-pressure side to the flushing-pressure limiting valve. In the normal driving mode these systems operate satisfactorily.

Difficulties arise, however, if the vehicle is no longer being driven by the internal combustion engine, but rather is being propelled in the overrun mode, also known as the negative mode. In this case, the vehicle mass propels the vehicle, e.g. in downhill travel, as a result of which the high-pressure side and low-pressure side of the closed hydraulic circuit change and the hydraulic motor operates as a pump and delivers a torque to the variable displacement pump. In this overrun mode, phases occur in which the high-pressure side and low-pressure side lie closely adjacent to each other, so that the spool-valve piston of the flushing spool valve remains in its neutral central position. In the case of very sturdy flushing spool valves which are configured to an opening pressure of 14 to 16 bar, operating pressures of +/−28 to 32 bar may occur without the flushing spool valve switching. Therefore, an exchange of oil from the closed circuit does not take place either. The oil heats up very strongly and may result in damage to the hydraulic motor. Tests using an additional temperature-regulating means or with the replacement of the compression springs by weaker compression springs have not led to any satisfactory result. On the contrary, severe pressure fluctuations have been found during operation, causing undesirable jarring through the entire vehicle.

It has namely turned out that, in the overrun mode, a relatively small volume of flushing flow is completely sufficient, provided that a rapid and easy response of the flushing spool valve is ensured even if the differences in pressure between the high-pressure and low-pressure line are small.

It is therefore a primary object of the present invention to provide a hydraulic spool valve that not only functions reliably at the customary high and constant differences in pressure, but also functions when there is a small and changing difference in the hydraulic pressure in the inlet bores.

It is therefore a further object of the invention to provide a hydraulic vehicle drive in such a manner that, even in the overrun mode, a satisfactory cooling of the hydraulic fluid is ensured.

These and other objects will be apparent to those skilled in the art.

BRIEF DESCRIPTION OF THE INVENTION

The spool valve of the present invention is provided with an expansion path for each compression spring starting from the pre-stressed state and limited by a stop. If a small difference in pressure between the high-pressure and low-pressure side attempts to displace the spool-valve piston out of its neutral central position, the compression spring set in the displacement direction assists the start of the displacement. The actions of the two compression springs still counterbalance each other during the start of the displacement and so, except for customary friction losses, the difference in pressure serves solely to accelerate the spool-valve piston. This state is maintained until the compression spring assisting the displacement movement comes to rest against its stop and the expansion path is used up. This position is referred to as the intermediate position, and the region between the neutral central position and the intermediate position is the additional control region which ensures a rapid response to small differences in pressure. If the difference in pressure continues to grow, only the pressure of the hydraulic fluid from the inlet bore having the higher pressure has to overcome the spring force acting in the opposite direction and the pressure of the hydraulic fluid on the low-pressure side until the customary extended end position is reached.

At the same time, it is envisioned that even as the spool-valve piston approaches the intermediate position a connection between the outlet bore and the inlet bore of lower pressure is produced. However, the flow cross section of this connection is set to be smaller than when the spool-valve piston has exceeded the intermediate position. This is because it has been shown that, in the event of small differences in pressure between the high-pressure line and low-pressure line, a reduced through flow quantity best matches these precise operating conditions. This is the case for the application which has already been mentioned concerning oil cooling in a hydraulic vehicle drive, as will be explained in greater detail below.

As mentioned above, some of the maximum circulation of oil in the closed circuit has to be continuously replaced even in the normal driving mode. The flushing spool valve according to the invention opens up further control possibilities for this, which possibilities can also be obtained even if the differences in pressure between the forward flow and return line of the hydraulic motor are small. For this purpose, the spool valve according to the invention may be installed at different locations and does not have to be installed in the housing of the hydraulic motor.

The spool valve of the present convention is connected via a connecting line to the feed pressure circuit for the closed hydraulic circuit, which is conventionally supplied by means of a filling pump. This additional connecting line ensures that, in the neutral central position of the spool-valve piston, a continuous flow of hydraulic fluid via the flushing-pressure limiting valve takes place and, above all, cools the motor housing. In the normal driving mode, i.e. when the spool-valve piston is in its extended end position and the low-pressure side of the high-pressure circuit is conducted to the flushing-pressure limiting valve, hydraulic fluid does not flow via the additional line on account of the pressure ratios in the closed hydraulic circuit.

BRIEF DESCRIPTION OF THE DRAWINGS

FIG. 4a shows the spool-valve piston again in its neutral central position;

FIG. 4b reproduces an intermediate position of the spool-valve piston;

FIG. 4c is an illustration in the extended end position of the spool-valve piston.

DETAILED DESCRIPTION OF THE INVENTION

Figure 1:
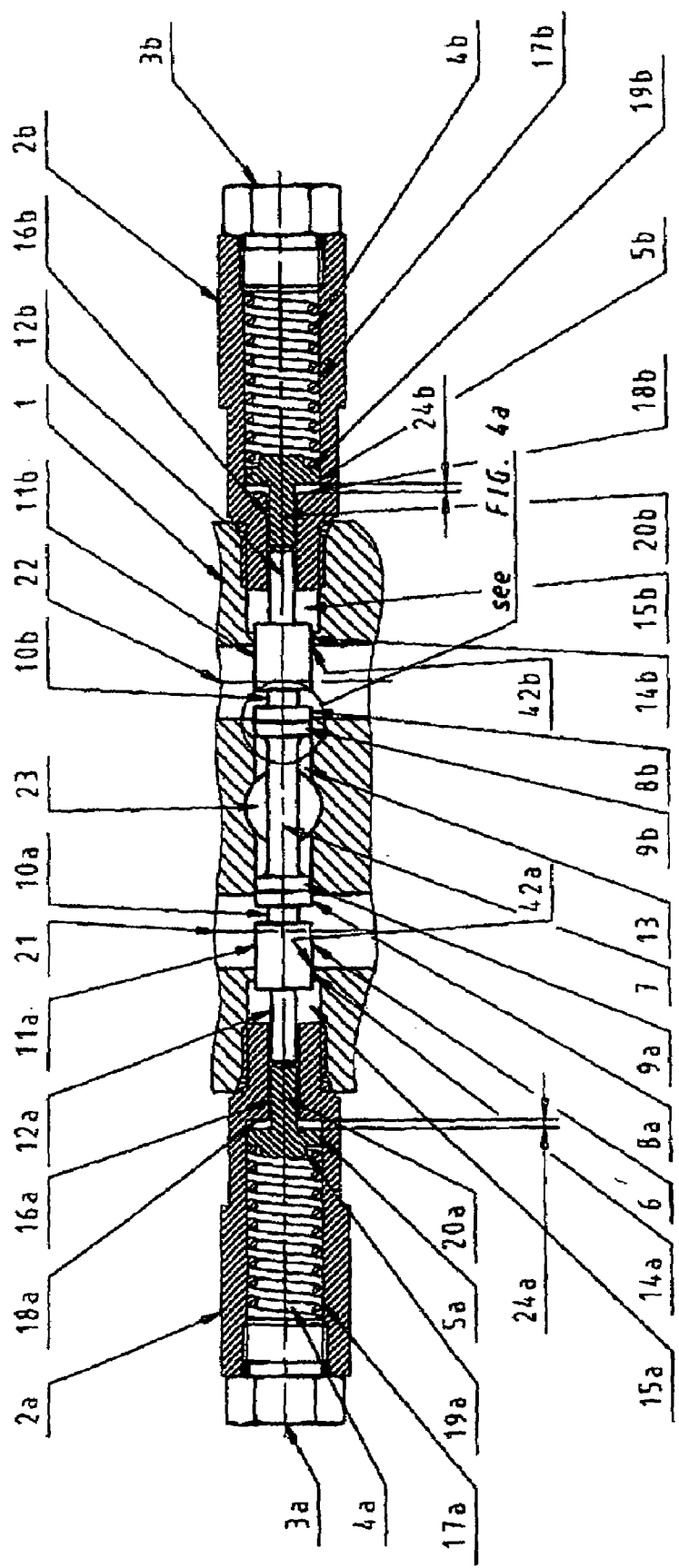
FIG. 1 is a longitudinal section through the hydraulic spool valve according to the invention, the spool-valve piston being situated in its neutral central position.

With reference to FIG. 1, a housing 1 of the spool valve according to the invention is shown. The housing may be, for example, for a hydraulic motor in which the spool valve is installed. Two spring housings 2a, b which are closed with closure screws 3a, b are screwed laterally onto the housing 1. The spring housings 2a, b contain the compression springs 4a, b which exert, via pressure tappets 5a, b, a contact pressure in the direction of the housing interior.

Figure 2:
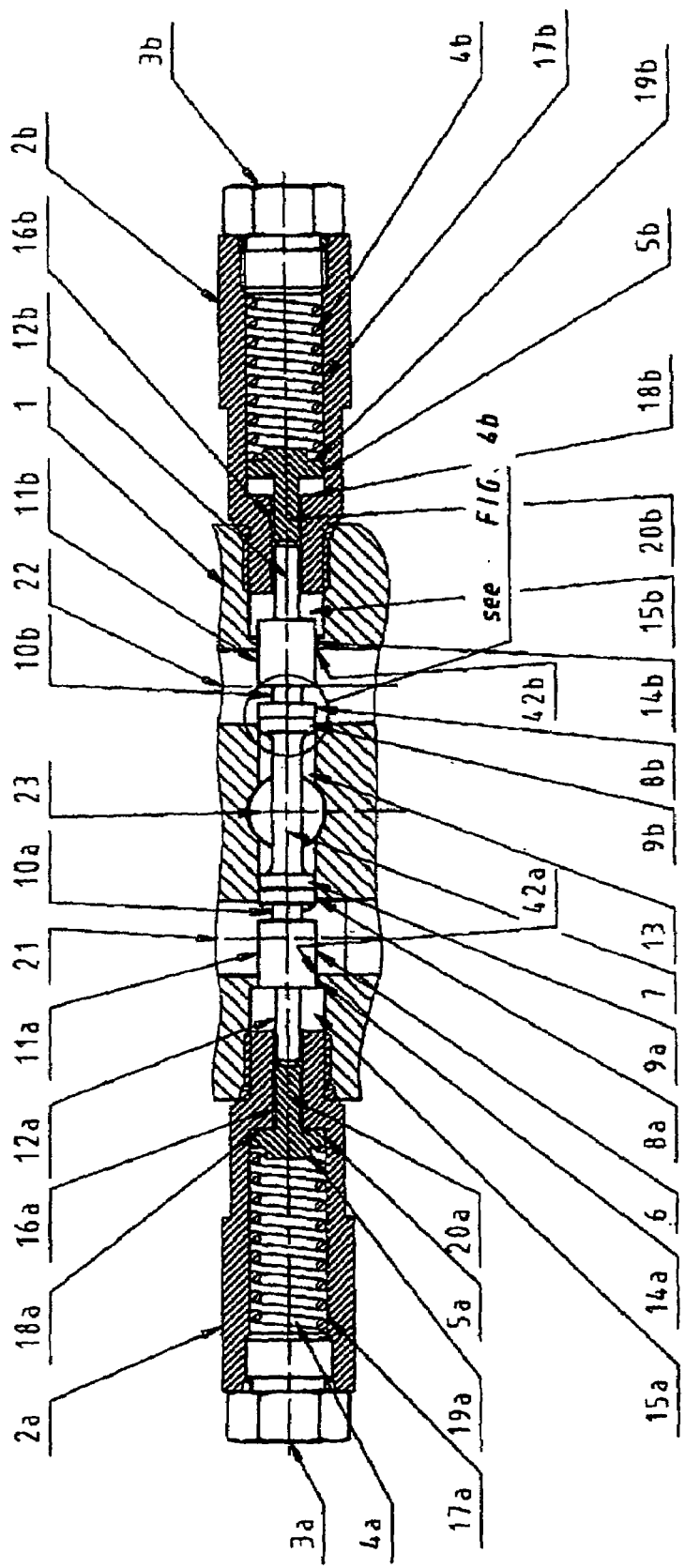
FIG. 2 shows a sectional illustration corresponding to FIG. 1, the spool-valve piston being situated in an intermediate position.
Figure 3:
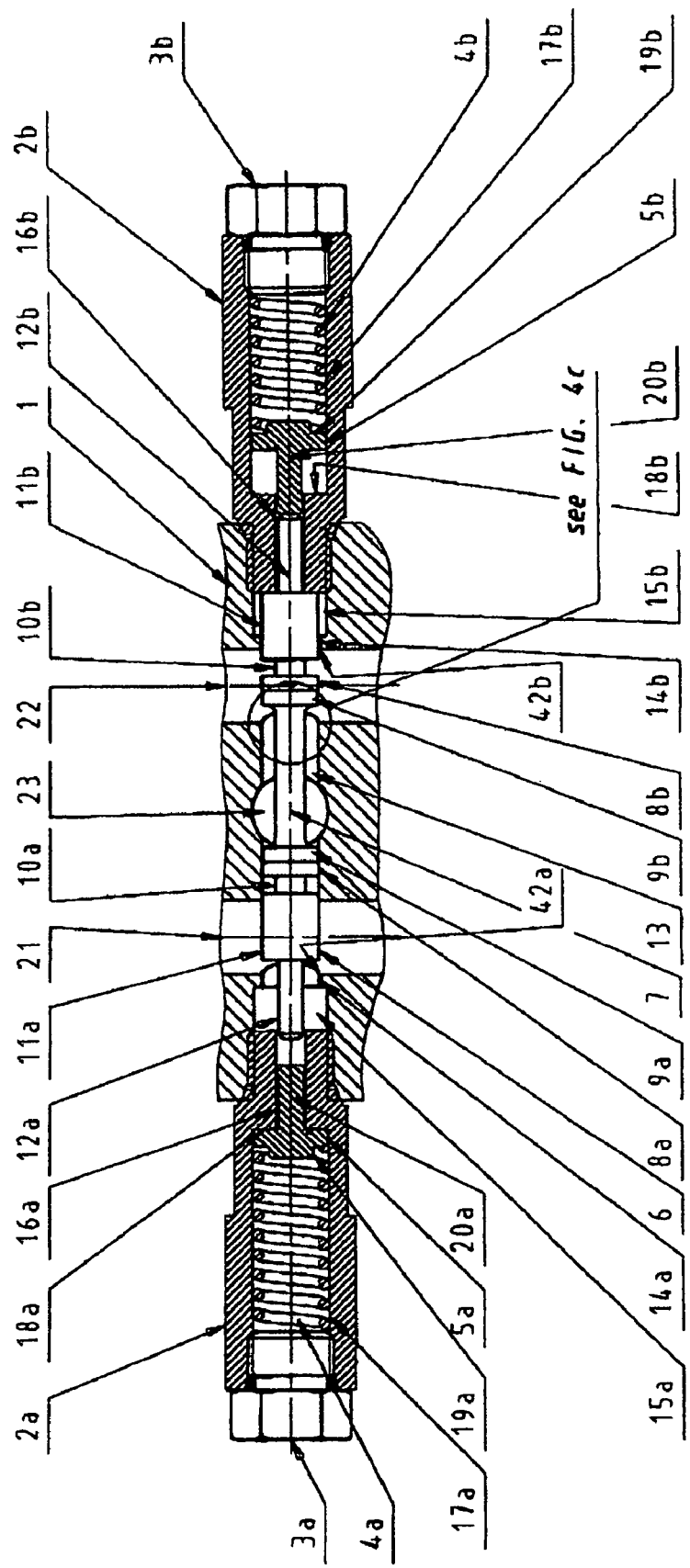
FIG. 3 corresponds to FIGS. 1 and 2 with the difference that the spool-valve piston is situated in its extended end position.

The housing 1 contains the spool-valve piston 6 which comprises a single component and has a cylindrical cross-section at every point, but shows a graduated contour in the longitudinal view. As shown in FIGS. 1 to 3, the spool-valve piston is constructed symmetrically in the longitudinal direction. It forms a stem-shaped central part 7 of reduced diameter in the centre. The central part 7 is adjoined on the left and right by passage collars 9a, b and first control pistons 8a, b. The enlarged illustrations according to FIGS. 4a–c, in particular, clearly show that the passage collars have a smaller diameter than the first control pistons. The first control pistons 8a, b are again adjoined to the outside on both sides by a separating web 10a, b of reduced diameter, these separating webs producing the connection between the first control pistons 8a, b and second control pistons ha, b. The second control pistons ha, b are followed on both sides to the outside by pressure pins 12a, b which, in the assembled state, for their part abut against the pressure tappets 5a, b.

It should be emphasized once again that the terms "first control piston 8a, b" and "second control piston 8a, b" refer only to different functions and not to separate parts. First and second control pistons form together with the stem-shaped central part 7, the passage collar 9a, b, the separating webs 10a, b and the pressure pins 12a, b a single part, namely the spool-valve piston 6.

In this case, the first control pistons 8a, b and second control pistons 8a, b have the same outside diameter which is matched to a housing bore 13 of the housing 1, with the result that the valve actuator can slide therein. Bore sections which continue the housing bore to the outside, in the direction of the spring housings 2a, b, are referred to by reference numerals 14a, b. Pressure chambers 15a, b which have a larger diameter than the housing bore 13 open out between the bore sections 14*a,b* and the end sides of the spring housings 2*a, b*. The spring bores formed in the spring housings 2*a, b* merge on those sides of the spring housings 2*a, b* which face the housing 1 into tappet bores 16*a, b* of reduced diameter. The pressure pins 12*a, b* of the spool-valve piston 6 slide in the tappet bores 16*a, b* in the assembled state.

The spool-valve piston sliding in the housing bore of the spool-valve housing can be produced as before as a rotationally symmetrical part which is economical to manufacture. The combination of first control pistons which are formed on the spool-valve piston and have directly adjacent passage collars of reduced diameter causes a reduction in the through flow cross section in the first working region of the spool valve between the neutral central position and the intermediate position.

The spool valve of the present invention could be produced by simple modification of a prior art spool valve, in that the spool-valve piston would merely have to be made somewhat longer than previously and at the same time the first control pistons which are already present would have to be twisted off in order to provide, by means of a graduation to annular collars, an additional through flow possibility for the hydraulic fluid. By contrast, the spool-valve housings could remain unchanged.

Annular shoulders which serve as stops 18*a, b*, which will be explained further below, are formed at the transition point between the spring bores 17*a, b* and the tappet bores 16*a, b*.

Each of the pressure tappets 5*a, b* has a spring plate 19*a, b* and a tappet pin 20*a, b*. In this case, the tappet pins 20*a, b* likewise slide in tappet bores 16*a, b*, where they strike, in the assembled state, against the end sides of the pressure pins 12*a, b*, which will also be explained in detail. The inwards movement of the pressure tappets 5*a, b*, which comes about under the influence of the compression springs 4*a, b*, comes to an end when the spring plates 19*a, b* bear against the stops 18*a, b*.

The arrangement of pressure tappets according to the present invention is a structurally simple way of initially maintaining joint movement of the compression springs with the spool-valve piston while allowing the two parts to decouple after the intermediate position is reached. Moreover, the arrangement of pressure tappets with a spring plate enables the installation of compression springs of different types of configuration.

Two inlet bores 21, 22, which are acted upon by the hydraulic fluid in the operating state, lead into the housing bore 13 of the housing 1. Depending on the operating state, the pressure of the hydraulic fluid in the inlet bores 21, 22 may be at the same level or may differ to a greater or lesser extent. During operation, each of the inlet bores 21, 22 may be the bore which conducts the hydraulic fluid at the higher or lower pressure. The outlet bore through which the hydraulic fluid leaves the spool valve again is referred to by 23. The spool-valve piston 6 can take up different positions within the housing bore 13. It will differentiate here between the neutral central position I, an intermediate position II and an extended end position III. Depending on which position is present, the connection between one of the inlet bores 21, 22 and the outlet bore 23 is blocked or opened to different extents.

Figure 4A:
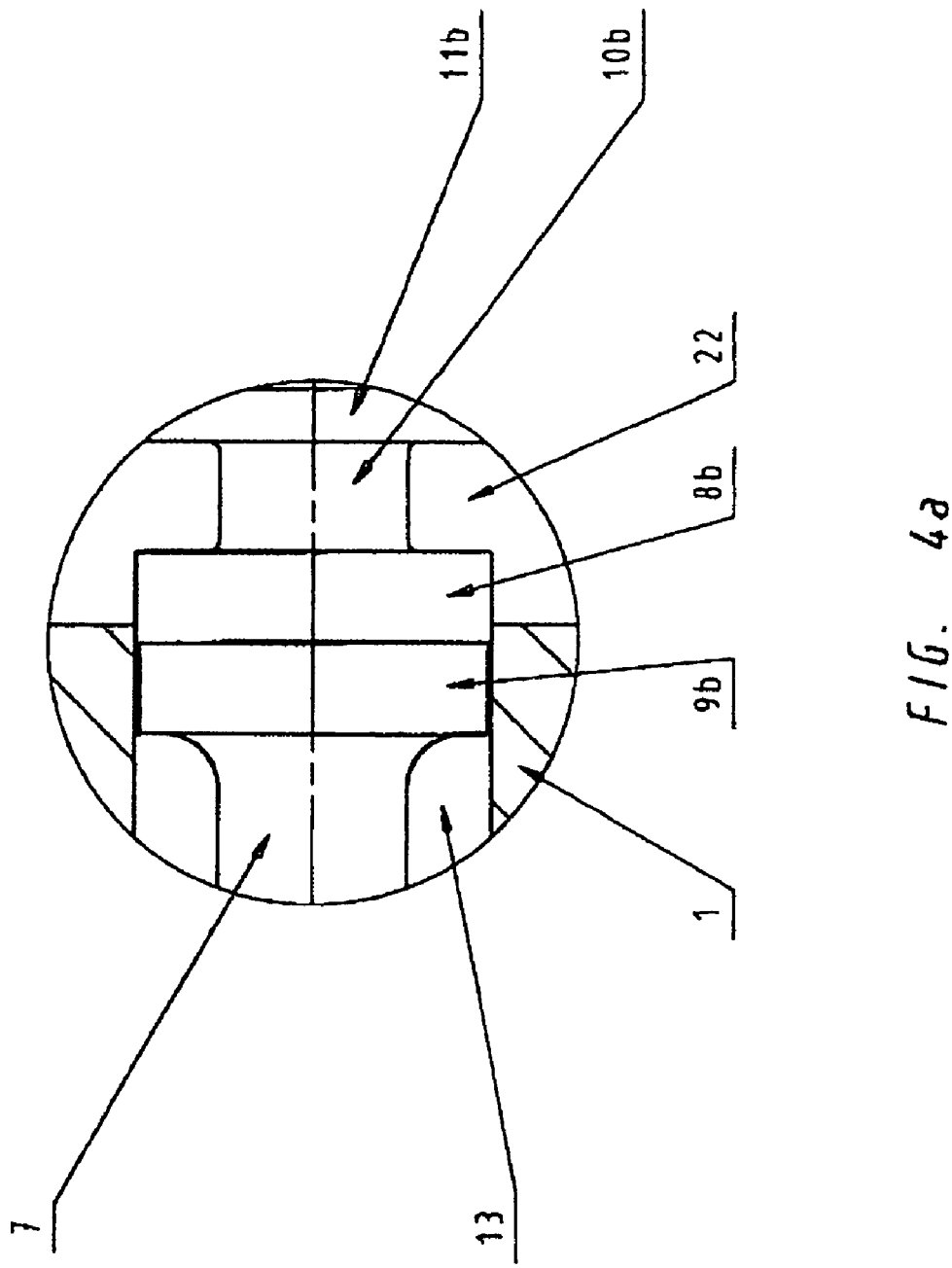
FIGS. 4a–c show further details of the illustrations according to FIGS. 1 and 3.
Figure 4B:
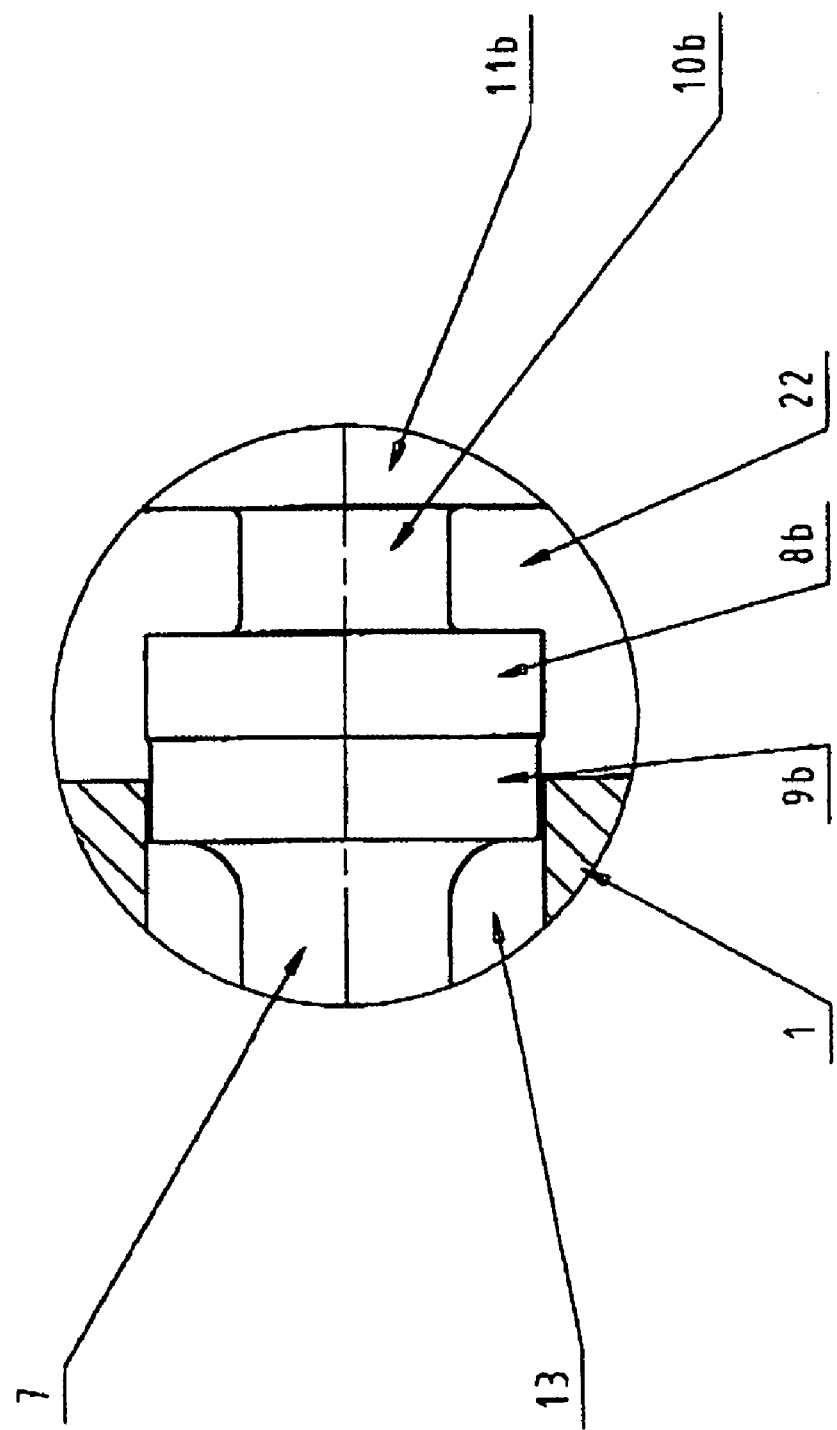
Figure 4C:
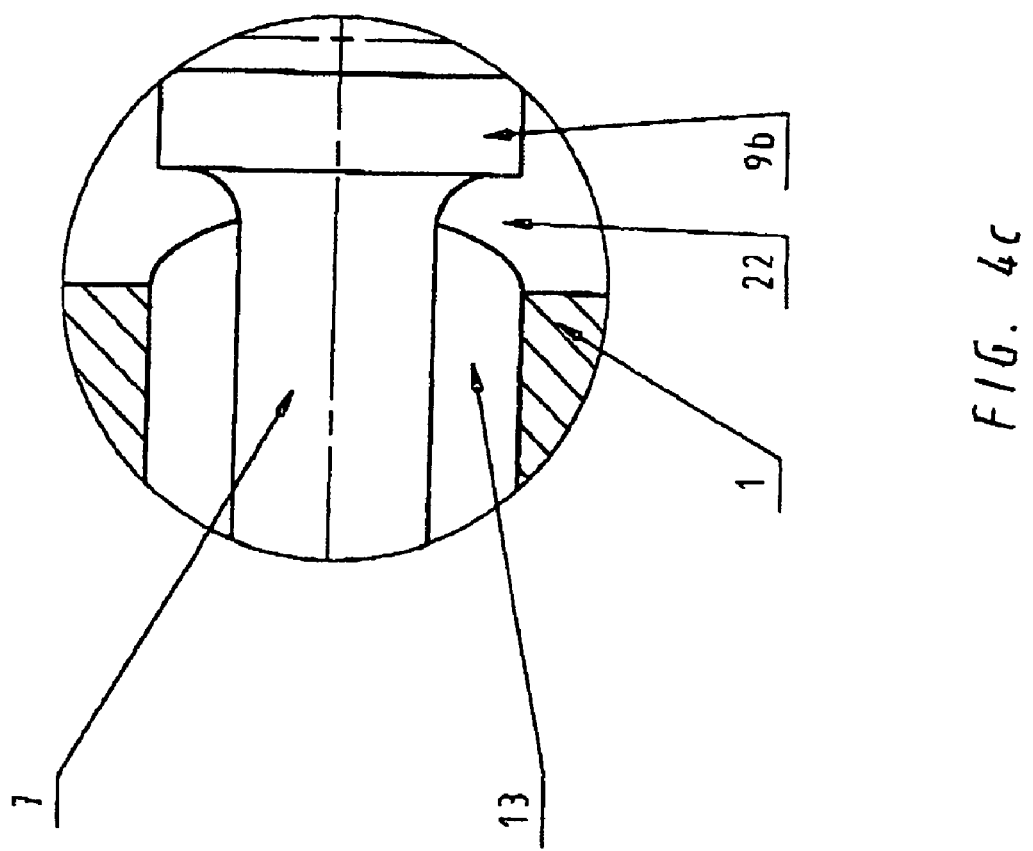

The details in this respect are revealed particularly well in FIGS. 4*a–c*.

FIG. 1 and FIG. 4*a* show the spool-valve piston 6 in its neutral central position. In this case, the first control pistons 8*a, b* close the access to the housing bore 13; there is no connection between the inlet bores 21, 22 and the outlet bore 23.

In the illustration according to FIGS. 2 and 4*b*, the end of the intermediate position II is reached. The one first control piston 8*b* is situated here in the region of the inlet bore 22 while the adjacent passage collar 9*b* has arrived in the lead-in region of the housing bore 13. As a consequence, there is a flow connection between the inlet bore 22, the housing bore 13 and the outlet bore 23. However, in view of the small difference in diameter between the housing bore 13 and the passage collar 9*b*, the passage cross section is very small.

If, by contrast, according to FIGS. 3 and 4*c* the extended end position III of the spool-valve piston 6 is reached, then the entire stem-shaped central part 7, which has a greatly reduced diameter, lies in the region between the outlet bore 23 and the inlet bore 22. As a consequence, there is now a flow connection of greatly enlarged cross section between the inlet bore 22 and the outlet bore 23.

It has also to be mentioned that, in the region of the bore sections 14*a, b*, an additional connection, as indicated by arrows 42*a, b* in FIGS. 1–3, is formed between the inlet bores 21, 22 and the pressure chambers 15*a, b*. The said additional connection may exist, for example, in small grooves which widen the circular bore for the second control pistons 11*a, b* outwards in some regions. Or a flattened section may be provided on the second control pistons 11*a, b*. This additional connection, which is indicated by arrows 42*a, b* in FIGS. 1 to 3, ensures that hydraulic fluid can also penetrate the pressure chambers 15*a, b*, which is imperative for the functioning of the spool valve described.

In operation, the spool valve 10 is situated in its central position according to FIGS. 1 and 4*a* and the pressure of the hydraulic fluid in the inlet bores 21, 22 is at the same level. In this position, the spool-valve piston is in a "floating" central position. The two compression springs 4*a, b* are pre-stressed, but the spring plates 19*a, b* are not bearing against the stops 18*a, b*. This is because the entire axial length of the spool-valve piston including its pressure pins 12*a, b* is greater than would correspond to the mutual distance of the pressure tappets from each other if their spring plates 19*a, b* could bear against the stops 18*a, b*. For each of the two compression springs 4*a, b*, an expansion path 24*a, b* is available until their associated pressure tappet 5*a, b* comes to rest against its stop 18*a, b*.

If the pressure of the hydraulic fluid gradually increases, for example, in the inlet bore 21, the differences in pressure in the pressure chambers 15*a, b* cause the spool-valve piston 6 to be displaced towards the inlet bore 22 having the lower pressure. This state is reproduced in FIGS. 2 and 4*b*. When the axial displacement region of the first control pistons 8*a, b* is exceeded, under the influence of the increasing hydraulic pressure on the lower pressure side, the passage collar 9*b* comes to lie in the region of the inlet bore 22. Hydraulic fluid of lower pressure will therefore flow out of the inlet bore 22 via the small passage cross section between the housing bore 13 and the passage collar 9*b* to the outlet bore 23. In this central region, the spool-valve piston 6 can be displaced even given very small differences in pressure. This is because in this region the spool-valve piston 6 is still under the influence of the two compression springs 4*a, b*, and so the compression spring 4*a* which is situated on the higher hydraulic pressure side assists the displacement movement of the spool-valve piston 6. As a consequence, the spool-valve piston can react even to small pressure fluctuations and alternatively open or close a connection between the inlet bore on the lower pressure side and the outlet bore 23.

As soon as the pressure of the hydraulic fluid in the 15 inlet bore 21 is considerably higher than the pressure in the inlet bore 22, the spool-valve piston is pushed towards the lower pressure side, i.e. to the right in the figures, to such an extent that the pressure tappet 5 on the higher pressure side strikes with its spring plate 19*a* against the stop 18*a*, whereupon the action of the compression spring 4*a* on the spool-valve piston 6 ceases. From this moment, a changed control characteristic commences by the hydraulic pressure in the inlet bore 21 namely having to act solely against the lower hydraulic pressure in the inlet bore 22 and the compression spring 4*b* situated on this side. FIG. 4*c* shows that, in this state, a larger flow cross-section is opened up for hydraulic fluid of lower pressure to overflow to the outlet bore 23. In this state, the spool valve has the function of either clearly opening or closing. The rapidly changing transitions between opening and closing, as were possible in the intermediate position II provided by one region, no longer occur now.

The manner of operation just described also occurs in a corresponding manner when the high-pressure and low-pressure sides in the inlet bores 21, 22 are interchanged.

Figure 5:
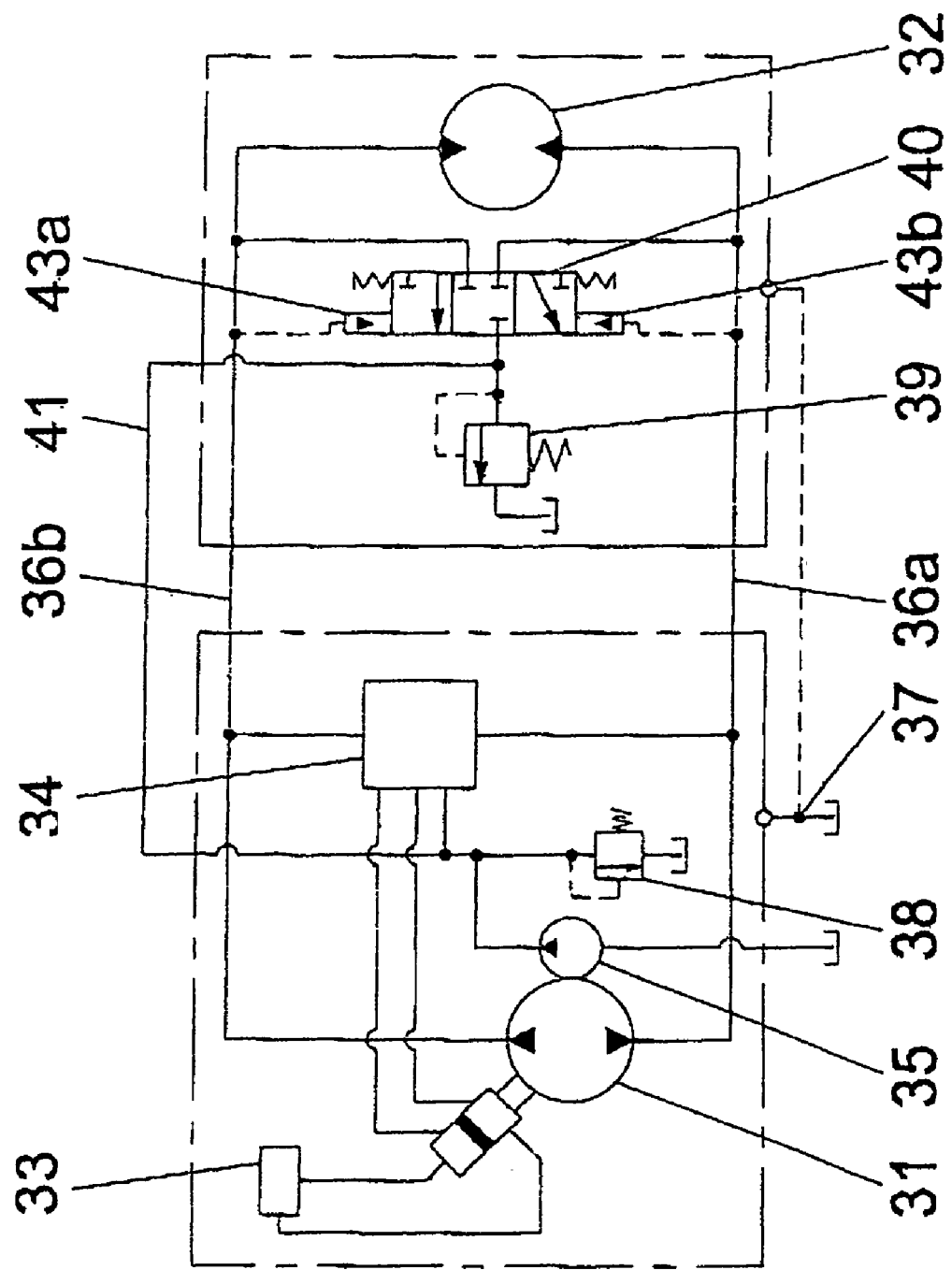
FIG. 5 contains a diagrammatic illustration of a hydraulic vehicle drive with a closed hydraulic circuit, in which a spool valve according to the invention is installed.

FIG. 5 shows the installation of a previously described hydraulic spool valve according to the invention as a flushing spool valve 40 in a hydraulic vehicle drive having a closed hydraulic circuit. The hydraulic circuit is formed by a variable displacement pump 31 and a hydraulic motor 32 which are connected by means of lines 36*a, b*. The variable displacement pump 31 is driven by an internal combustion engine, generally a diesel engine, while the hydraulic motor 32 acts on the drive wheels of the vehicle. A servo valve 33 enables the variable displacement pump 31 to be displaced in an infinitely variable manner in both directions. The variable displacement pump 31 accommodates a high-pressure regulating device and a high-pressure circuit feeder 34 which prevent the high pressure applied by the pump and the oil flow from exceeding a maximum value. A filling pump 35 which continuously supplies the closed circuit with a sufficient amount of oil and ensures that the servo system is supplied is driven together with the variable displacement pump 31. A filling-pressure limiting valve 38 limits the maximum feed pressure of the filling pump. The high-pressure lines 36*a, b* connect the variable displacement pump 31 to the hydraulic motor 32, with it being possible, depending on forwards or reverse travel, for each of the lines 36*a* or 36*b* to conduct the hydraulic fluid with the operationally higher or lower pressure. The customary oil leakage lines for a respective system component are referred to by 37. In this case, each oil leakage line is, as a rule, accommodated in a different housing.

The flushing spool valve 40 shown in FIGS. 1 to 4*c* is installed in the hydraulic motor 32. The flushing spool valve 40 and the hydraulic motor 32 therefore have a common housing. The flushing spool valve 40 alternatively connects one of the high-pressure lines 36*a, b* to a flushing-pressure limiting valve 39. In this case, the flushing spool valve 40 is likewise controlled by the hydraulic pressure, prevailing in the high-pressure lines 36*a, b*, of the hydraulic fluid flowing there. At 43*a, b* the pressure chambers having the second control piston are indicated, the said pressure chambers bringing about the displacement of the spool-valve piston in the flushing spool valve 40 under the pressure of the hydraulic fluid in the manner already described. When the flushing-pressure limiting valve 39 is opened, hydraulic fluid flows from the side of the lower pressure in each case in relatively small or large quantities through the common housing of the flushing spool valve 40 and hydraulic motor 32, so that the latter is cooled. Finally, the flushing-pressure limiting valve 39 is additionally connected via a connecting line 41 to the filling pump 35 for the feed pressure circuit.

FIG. 5 diagrammatically illustrates the cooling of the motor of the closed hydraulic circuit. In the normal driving mode, the internal combustion engine drives the variable displacement pump 31 and feeds hydraulic fluid via the line 36*a* to the hydraulic motor 32, from which the hydraulic fluid having reduced pressure flows back via the line 36*b* to the variable displacement pump 31. There is a considerable and unambiguous difference in pressure between the hydraulic fluid in the line 36*a* and that in the line 36*b*. As a consequence, the flushing spool valve 40 opens the connection between the line 36*b*, which has the hydraulic fluid of lower pressure, and the flushing-pressure limiting valve 39. This flushing-pressure limiting valve is set to be lower than the filling-pressure limiting valve 38, thus producing a continuous, artificial leakage. This continual leakage, also called scouring quantity, amounts to approximately 10% of the maximum circulation of oil in the closed circuit.

However, these clear ratios are disturbed if the vehicle passes into the overrun mode, also known as the negative mode. This is the case if the vehicle is being propelled downhill. The original high-pressure side of the closed circuit then becomes the low-pressure side and the hydraulic fluid is conveyed by the hydraulic motor 32, which now acts as a pump, and produces a torque at the variable displacement pump 31. In this overrun mode, the hydraulic pressures on the high-pressure side and low-pressure side may lie very close together and change very rapidly. If, in this case, the flushing spool valve is equipped with very powerful compression springs corresponding to a hydraulic pressure of 14 to 16 bar, then the drive can be operated in a range of +/−28 to 32 bar without the flushing spool valve switching and without oil from the closed circuit being exchanged. This results in a rapid heating of the hydraulic fluid and also of the housing of the hydraulic motor 32. The installation of weaker compression springs cannot eliminate this problem because the pressure losses and flow forces in the closed circuit would mean that the flushing spool valve would no longer switch correctly and precisely at the transition from the overrun mode into the normal mode the vehicle would be subjected to severe pressure fluctuations which would pass as an unpleasant jarring through the entire vehicle.

The flushing spool valve 40 designed in accordance with the invention eliminates this problem by operating, given the small differences in pressure which occur between the high-pressure side and low-pressure side, in the intermediate position which has already been described and in which it rapidly responds to pressure fluctuations and can easily be transferred from the open into the closed position and vice versa. Since the closed position is floating, because the centering compression springs do not bear against their stops, a very much smaller amount of force is required than in the prior art in order to move the flushing spool valve out of its neutral position. Although, in this range of movement, which lies at a very low displacement-force level, only small scouring quantities are released, they are nevertheless sufficient in order to sufficiently flush and cool the hydraulic motor and the closed circuit. In this case, the negative phenomena which have been described during the transition from the overrun mode to the normal mode no longer occur, and also the critical maximum temperatures of the hydraulic fluid are not reached. The flushing spool valve according to the invention therefore operates in two stages, each of which is optimally coordinated with a certain operating region of the vehicle.

The effect described is further assisted by the connecting line 41. It ensures that, in the neutral central position of the flushing spool valve 40, oil flows continuously via the flushing-pressure limiting valve 39 through the housing of the hydraulic motor 32 and therefore cools the latter. A decisive factor in this consideration is that, in the normal mode, i.e. when the spool-valve piston 6 of the flushing spool valve 40 has been guided into its extended end position III, the pressure ratios in the high-pressure circuit of the closed circuit mean that hydraulic fluid does not flow via the connecting line 41 and therefore no losses of feed oil occur. In this case, additional flushing is not required either in the normal mode or in the overrun mode. Only if, on account of the above-described pressure ratios, the flushing spool valve 40 is situated in its neutral central position is hydraulic fluid propelled, as it were as a stand-by function, via this external line into the housing of the hydraulic motor 32.

It is therefore seen that by the use of an expansion path for each compression spring, this invention permits the hydraulic spool valve to not only function reliably at the customary high and constant differences in pressure, but also function when there is a small and changing difference in the hydraulic pressure in the inlet bores.

What is claimed is:

1. A hydraulic spool valve having a spool-valve piston, which is arranged in a housing bore in a manner allowing it to be displaced longitudinally and which is assigned, on each end side, a respective compression spring which counteracts a displacement of the spool-valve piston towards this compression spring, while the two compression springs together, owing to their pre-stress, effect a neutral central position of the spool-valve piston, which position encompasses one region and in which the through flow of hydraulic fluid through the spool-valve is blocked, having two inlet bores and an outlet bore arranged between them, for hydraulic fluid, the inlet bores and the outlet bore all leading into the housing bore and a difference in pressure of the hydraulic fluid situated in the two inlet bores causing the spool-valve piston to be displaced, with the consequence that, in the extended end position of the spool-valve piston, the outlet bore is connected to that inlet bore in which the lower pressure of the hydraulic fluid prevails, characterized in that for each compression spring an expansion path, starting from the pre-stressed state and limited by a stop, is provided in such a manner that the spool-valve piston, when displaced on both sides out of its neutral central position into an intermediate position defined by the stop, is acted upon by the two compression springs, but, after the stop has come into effect and the intermediate position has been exceeded in the direction of the extended end position, is only acted upon by the one compression spring, which in each case counteracts the displacement of the said spool-valve piston, and in that even as the spool-valve piston approaches the intermediate position from the neutral central position a connection between the outlet bore and the inlet bore of lower pressure is produced, the flow cross section of this connection being smaller than when the spool-valve piston has exceeded the intermediate position.

2. The hydraulic spool valve of claim 1 wherein the spool-valve piston has a stem-shaped central part, the outside diameter of which is smaller than the inside diameter of the housing bore, and, at a distance on both sides from the center, a respective control piston with a diameter corresponding to the housing bore, and in that a respective passage collar of reduced diameter directly adjoining the first control pistons to the inside, specifically in such an arrangement that, in the neutral central position of the spool-valve piston, the two first control pistons close the lead-in points of the two inlet bores into the housing bore while, after a first displacement outwards as far as the intermediate position, a passage collar situated in one of the lead-in points opens up the flow path of reduced cross section until, after the spool-valve piston has exceeded the intermediate position, the stem-shaped central part comes to lie on the lead-in point, thus opening up the maximum passage cross-section.

3. The hydraulic spool valve of claim 2 further comprising a separating web, a second control piston, and a pressure pin, which is in operative connection with one of the compression springs, on the spool-valve piston towards the outside on both sides of the first control pistons.

4. The hydraulic spool valve of claim 1 wherein the compression springs are connected to the end sides of the spool-valve piston via pressure tappets, each pressure tappet having a spring plate and a tappet pin which is reduced in diameter in comparison with the spring plate and faces the spool-valve piston, the spring plate bearing with its one side against the compression spring assigned to it and being designed to bear with its other side against the stop, which determines the possible expansion path of the compression spring.

5. The hydraulic spool valve of claim 1 wherein the compression springs are situated in separate spring housings which are connected to the housing of the spool valve and are closed by closure screws with the compression springs bearing against them on their inside.

6. The hydraulic spool valve of claim 1 wherein the compression springs are helical springs which are inserted into spring bores, which run coaxially with the spool-valve piston and have an annular shoulder, which serves as the stop and limitation for the possible expansion path of the helical springs.

7. The hydraulic spool valve of claim 1 wherein the hydraulic spool valve is installed into a hydraulic motor.

8. The hydraulic spool valve of claim 1 wherein the hydraulic spool valve is a flushing spool valve in a hydraulic vehicle drive.

9. A hydraulic vehicle drive having a closed hydraulic circuit which comprises a variable displacement pump, a hydraulic motor driving the drive wheels of the vehicle and two lines which connect the variable displacement pump and the hydraulic motor and are intended for the hydraulic fluid, it being possible for each of the lines to be the high-pressure line or low-pressure line of the closed hydraulic circuit, depending in each case on the direction of travel of the vehicle, having a flushing spool valve which is situated parallel to the hydraulic motor on the lines of the hydraulic circuit and, with the difference in pressure of the hydraulic fluid that prevails in the normal driving mode, connects the particular low-pressure line to a flushing-pressure limiting valve, which conducts a flushing flow of the hydraulic fluid through the hydraulic motor, but interrupts the connection to the flushing-pressure limiting valve if the difference in pressure fails to appear, characterized by such a design of the flushing spool valve that, with a difference in pressure between the high-pressure and low-pressure line that is smaller in comparison to the normal driving mode, although the connection between the low-pressure line and the flushing-pressure limiting valve is likewise produced, the volume of the flushing flow is, however, significantly reduced in comparison to the normal driving mode; wherein the flushing spool valve has the features of the hydraulic spool valve piston, which is arranged in a housing bore in a manner allowing it to be displaced longitudinally and which is assigned, on each end side, a respective compression spring which counteracts a displacement of the spool-valve piston towards this compression spring, while the two compression springs together, owing to their pre-stress, effect a neutral central position of the spool-valve piston, which position encompasses one region and in which the through flow of hydraulic fluid through the spool-valve is blocked, having two inlet bores and an outlet bore arranged between them, for hydraulic fluid, the inlet bores and the outlet bore all leading into the housing bore and a difference in pressure of the hydraulic fluid situated in the two inlet bores causing the spool-valve piston to be displaced, with the consequence that, in the extended end position of the spool-valve piston, the outlet bore is connected to that inlet bore in which the lower pressure of the hydraulic fluid prevails, characterized in that for each compression spring an expansion path, starting from the pre-stressed state and limited by a stop, is provided in such a manner that the spool-valve piston, when displaced on both sides out of its neutral central position into an intermediate position defined by the stop, is acted upon by the two compression springs, but, after the stop has come into effect and the intermediate position has been exceeded in the direction of the extended end position, is only acted upon by the one compression spring, which in each case counteracts the displacement of the said spool-valve piston, and in that even as the spool-valve piston approaches the intermediate position from the neutral central position a connection between the outlet bore and the inlet bore of lower pressure is produced, the flow cross section of this connection being smaller than when the spool-valve piston has exceeded the intermediate position.

10. The hydraulic vehicle drive of claim 9 further comprising a filling pump for the supply of a feed pressure circuit for the closed hydraulic circuit wherein a flushing-pressure limiting valve is additionally connected to the feed pressure circuit via a connecting line.

* * * * *